P. DAIMLER.
CLUTCH ACTUATING MECHANISM.
APPLICATION FILED SEPT. 16, 1911.
1,039,495.
Patented Sept. 24, 1912.
2 SHEETS—SHEET 1.
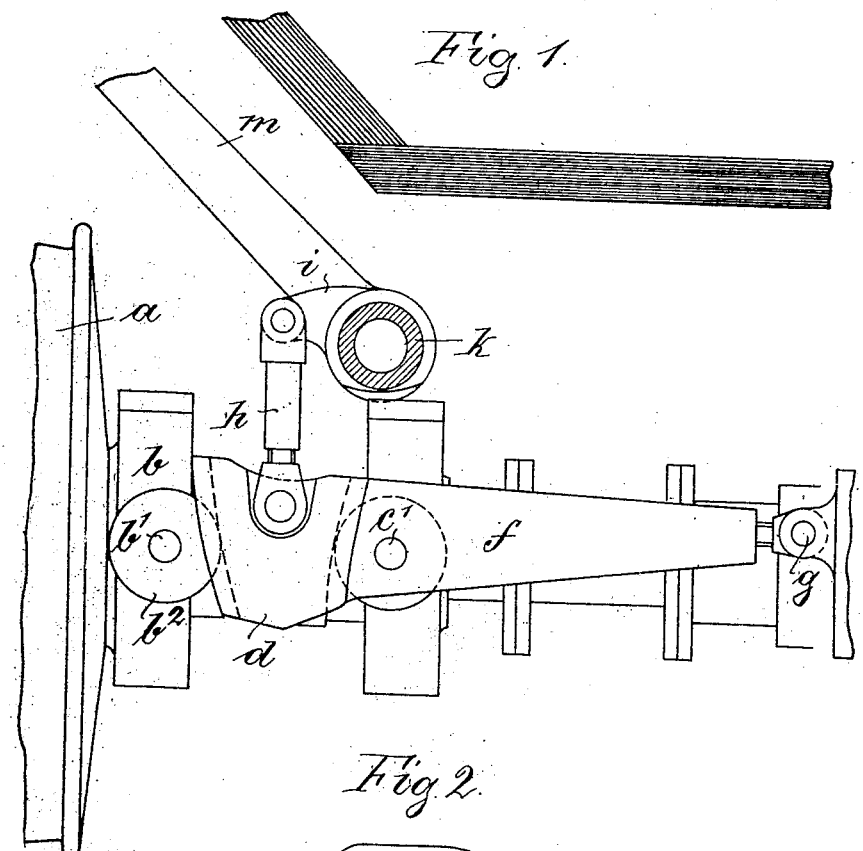
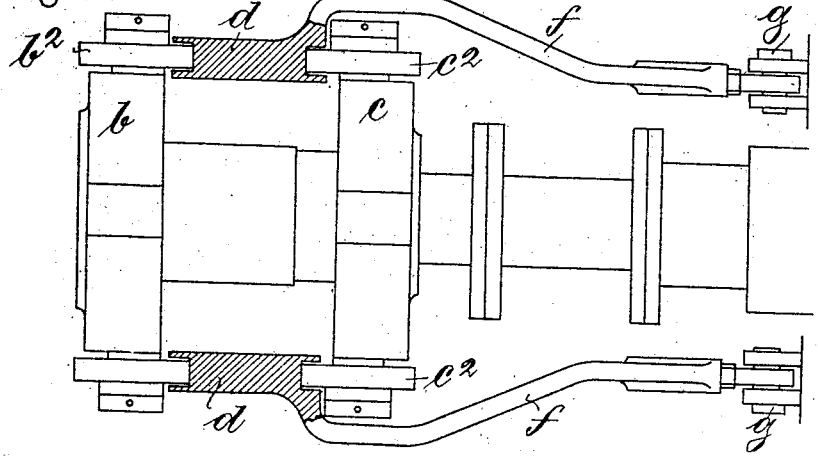

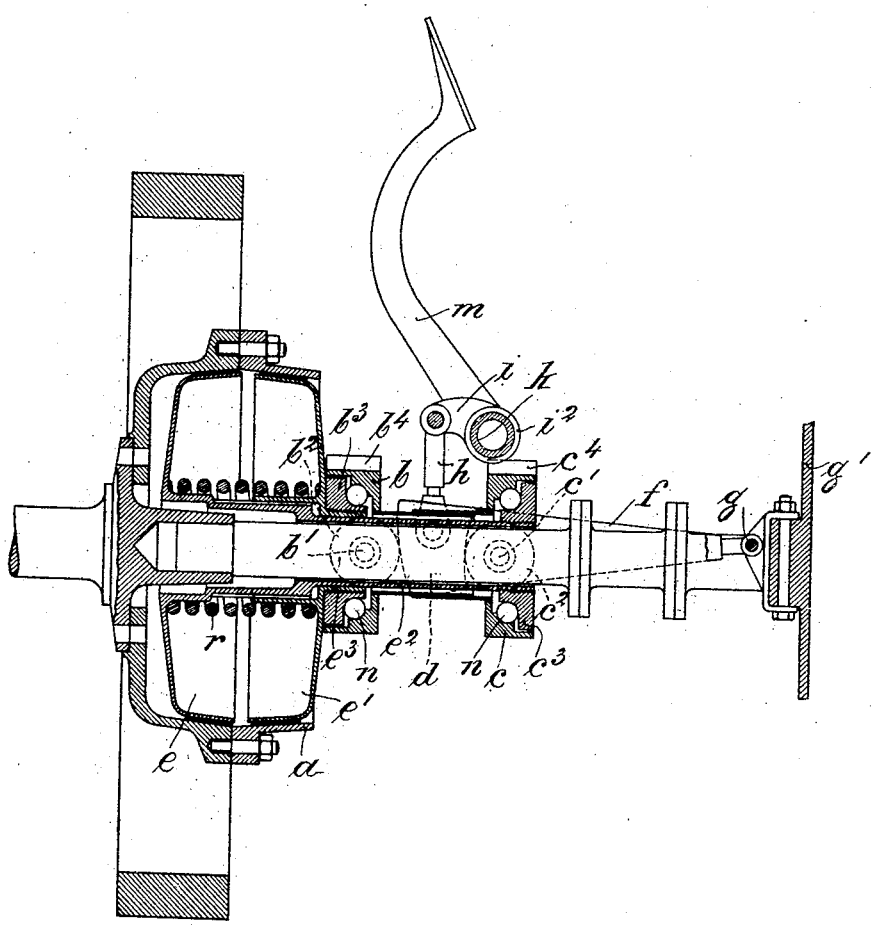

UNITED STATES PATENT OFFICE.

PAUL DAIMLER, OF UNTERTÜRKHEIM, STUTTGART, GERMANY, ASSIGNOR TO DAIMLER MOTORENGESELLSCHAFT, OF UNTERTÜRKHEIM, NEAR STUTTGART, GERMANY.

CLUTCH-ACTUATING MECHANISM.

1,039,495.     Specification of Letters Patent.     Patented Sept. 24, 1912.

Application filed September 16, 1911. Serial No. 649,763.

*To all whom it may concern:*

Be it known that I, PAUL DAIMLER, a subject of the King of Wurttemberg, and resident of Untertürkheim, Stuttgart, in the Kingdom of Wurttemberg, German Empire, have invented a new and Improved Clutch-Actuating Mechanism, of which the following is a specification.

This invention relates to clutch actuating mechanism chiefly intended for the clutches of automobiles, of the type in which two cones slidably movable in opposite directions on one shaft to be coupled, under the action of a spring, are adapted to engage friction-surfaces carried by the other shaft to be coupled, and in which the cones are provided with concentrically and laterally projecting hubs, extending beyond the casing of the clutch, and which are engaged by the disengaging device in known manner.

According to the present invention the disengaging gear is so constructed that it consists of simple and rigidly mounted parts and therefore works very reliably. A ring or other suitably shaped part is secured against rotation upon each of the concentric hubs of the cones and these rings or the like are engaged by means of wedges which are supported and guided by pivoted arms or the like. The wedges or the pivoted arms are connected with the disengaging lever so that on operating the latter the wedges are forced between the rings on the concentric hubs so that under the wedging action, the slidable cones are moved against the action of the spring so as to disengage from the friction surfaces.

In order to obtain an efficiently operating device, the engaging surfaces of the wedges are curved in the plane of oscillation of the pivoted arms, that is to say in the longitudinal direction of the wedges, and these curved surfaces are adapted to bear against rollers carried by the rings on the concentric hubs.

In order that the invention may be more clearly understood, reference is made to the accompanying drawings, which show by way of example one method of carrying out my invention, so much of the friction clutch being shown as is necessary for the invention to be clearly understood.

Figure 1 is a side view of the disengaging gear, Fig. 2 is a plan of same partly in section. Fig. 3 is a vertical section through the clutch and its actuating mechanism.

$a$ indicates the casing of the clutch whose interior surface constitutes a double frusto-conical friction surface.

$e$ $e'$ are frusto-conical friction members coöperating with the interior surface of the casing $a$ and having laterally projecting hubs $e^2$ $e^3$ respectively arranged concentrically the one within the other. Secured on the outer end of the inner hub $e^2$ is a ball ring $c^3$ and loosely mounted on the hub $e^2$ and bearing against the hub $e^3$ is another ball ring $b^3$, these ball rings $b^3$ $c^3$ coöperating with loose rings $b$ and $c$ respectively, and balls $n$ to form ball bearings, the loose rings secured against rotation by means of projections $b^4$ and $c^4$ on rings $b$ and $c$ respectively, the projection $c^4$ engaging in a recess $i'$ in the hub $i^2$ of a crank $i$ hereinafter referred to, while the projection $b^4$ is engaged by any fixed part. The rings $b$ and $c$ are provided with pins $b'$ and $c'$ respectively, on which are rotatably mounted the rollers $b^2$ $c^2$ respectively. Between each pair of rollers $b^2$ $c^2$ engages a wedge $d$ which is carried by an arm $f$ pivoted at $g$ to the change speed gear casing $g'$ or to any other convenient and stationary part of the vehicle frame. Pivotally connected to the wedges $d$ are connecting rods $h$ articulated to cranks $i$ on the shaft $k$ of the disengaging lever $m$, projecting through the foot-board $l$ of the vehicle. As shown in Fig. 1 of the drawings, the engaging surfaces of the wedges $d$ are curved in the longitudinal direction, that is to say, in the plane of oscillation of the levers $f$, in order that the wedges may evenly operate on the rollers $b^2$ $c^2$ in spite of their arcuate movement about the pivots $g$. The wedges $d$ are also preferably grooved, as shown in Fig. 2, in order to insure the engagement thereof with the rollers $b^2$ $c^2$.

On depressing the disengaging lever $m$, the wedges $d$ are forced between the rollers $b^2$ $c^2$ through the medium of the cranks $i$ and connecting rods $h$. The pivoted arms $f$ control the movement of the wedges so that the latter cannot move either in the direction of the axis of the shafts to be coupled or at right angles thereto. By this means a uniform wedging effect on the rollers $b^2\ c^2$ is insured. On the wedges $d$ being forced between the rollers $b^2\ c^2$, the rings $b$ and $c$ carrying the rollers are forced apart and through the balls $n$, rings $b^3$ and $c^3$ and hubs $e^2$ and $e^3$ the cones are disengaged from the friction surfaces. A spring $r$ is arranged in known manner between the cones $e\ e'$ of the clutch in order to return the friction cones to coupling position on the release of the disengaging lever $m$.

I claim:—

1. In combination with a double cone friction clutch having two cones slidably movable in opposite directions on one shaft to be coupled under the action of a spring, friction surfaces carried by the other shaft to be coupled and concentrically and laterally projecting hubs on said cones; an abutment on each of said hubs, a wedge between said abutments, a pivoted arm carrying said wedge, a disengaging lever and a connection between said lever and said wedge, whereby on actuating said lever, said abutments are forced apart to disengage said cones from the friction surfaces.

2. In combination with a double cone friction clutch having two cones slidably movable in opposite directions on one shaft to be coupled under the action of a spring, friction surfaces carried by the other shaft to be coupled and concentrically and laterally projecting hubs on said cones; an abutment on each of said hubs, a plurality of wedges between said abutments, pivoted arms carrying said wedges, a disengaging lever and connections between said lever and wedges whereby, on actuating said lever, said abutments are forced apart to disengage said cones from the friction surfaces.

3. In combination with a double cone friction clutch having two cones slidably movable in opposite directions on one shaft to be coupled under the action of a spring, friction surfaces carried by the other shaft to be coupled and concentrically and laterally projecting hubs on said cones; an abutment on each of said hubs, a wedge between said abutments, and having its engaging edges curved in the longitudinal direction of the wedge, a pivoted arm carrying said wedge, a disengaging lever and a connection between said lever and wedge whereby, on actuating said lever, said abutments are forced apart to disengage said cones from the friction surfaces.

4. In combination with a double cone friction clutch having two cones slidably movable in opposite directions on one shaft to be coupled under the action of a spring, friction surfaces carried by the other shaft to be coupled and concentrically and laterally projecting hubs on said cones; an abutment on each of said hubs, a plurality of wedges between said abutments and having their engaging edges curved in the longitudinal direction of the wedges, pivoted arms carrying said wedges, a disengaging lever and connections between said lever and wedges, whereby, on actuating said lever, said abutments are forced apart to disengage said cones from the friction surfaces.

5. In combination with a double cone friction clutch having two cones slidably movable in opposite directions on one shaft to be coupled under the action of a spring, friction surfaces carried by the other shaft to be coupled and concentrically and laterally projecting hubs on said cones; an abutment on each of said hubs, a roller on each of said abutments, a wedge between said rollers, a pivoted arm carrying said wedge, a disengaging lever and a connection between said lever and said wedge whereby, on actuating said lever, said rollers and abutments are forced apart to disengage said cones from the friction surfaces.

6. In combination with a double cone friction clutch having two cones slidably movable in opposite directions on one shaft to be coupled under the action of a spring, friction surfaces carried by the other shaft to be coupled and concentrically and laterally projecting hubs on said cones; an abutment on each of said hubs, a pair of rollers on opposite sides of each of said abutments, a pair of wedges between each corresponding pair of rollers, pivoted arms carrying said wedges, a disengaging lever and connections between said lever and said wedges whereby, on actuating said lever, said rollers and abutments are forced apart to disengage said cones from the friction surfaces.

7. In combination with a double cone friction clutch having two cones slidably movable in opposite directions on one shaft to be coupled under the action of a spring, friction surfaces carried by the other shaft to be coupled and concentrically and laterally projecting hubs on said cones; an abutment on each of said hubs, a roller on each of said abutments, a wedge between said rollers and having its engaging edges curved in the longitudinal direction of the wedge, a pivoted arm carrying said wedge, a disengaging lever and a connection between said lever and said wedge whereby, on actuating said lever, said rollers and abutments are forced apart to disengage said cones from the friction surfaces.

8. In combination with a double cone friction clutch having two cones slidably movable in opposite directions on one shaft to be coupled under the action of a spring, friction surfaces carried by the other shaft to be coupled and concentrically and laterally projecting hubs on said cones; an abutment on each of said hubs, a pair of rollers on opposite sides of each of said abutments, a pair of wedges between each corresponding pair of rollers, and having their engaging edges curved in the longitudinal direction of the wedges, pivoted arms carrying said wedges, a disengaging lever and connections between said lever and said wedges whereby, on actuating said lever, said rollers and abutments are forced apart to disengage said cones from the friction surfaces.

In witness whereof I have hereunto set my hand in the presence of two witnesses.

PAUL DAIMLER.

Witnesses:
 ROBERT UHLAND,
 FISDE KLAIBER.